United States Patent
Morioka et al.

(10) Patent No.: US 7,626,304 B2
(45) Date of Patent: Dec. 1, 2009

(54) STATOR AND MOTOR, TO WHICH THE STATOR IS APPLIED, AND METHOD OF MANUFACTURING THE STATOR

(75) Inventors: Masayuki Morioka, Osaka (JP);
Yasuaki Matsushita, Kyoto (JP);
Yoshihiro Kira, Osaka (JP); Shinya Tamura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/573,743

(22) PCT Filed: Jul. 11, 2006

(86) PCT No.: PCT/JP2006/313728
§ 371 (c)(1),
(2), (4) Date: Feb. 15, 2007

(87) PCT Pub. No.: WO2007/043224
PCT Pub. Date: Apr. 19, 2007

(65) Prior Publication Data
US 2008/0315710 A1    Dec. 25, 2008

(30) Foreign Application Priority Data
Oct. 12, 2005    (JP) .............................. 2005-297501

(51) Int. Cl.
*H02K 1/14*    (2006.01)
(52) U.S. Cl. ................ 310/216.004; 310/216.009; 310/216.057; 336/212; 336/233; 29/609
(58) Field of Classification Search ................ 310/194, 310/208, 216–218, 254; 336/212, 233, 234; 29/596–598, 603.1, 603.2, 609
See application file for complete search history.

(56) References Cited

U.S. PATENT DOCUMENTS

| 4,665,329 | A | * | 5/1987 | Raschbichler ................ 310/13 |
| 6,049,153 | A | * | 4/2000 | Nishiyama et al. ..... 310/156.53 |
| 6,737,785 | B2 | * | 5/2004 | De Luca et al. ............. 310/218 |
| 6,858,964 | B2 | * | 2/2005 | Masumoto et al. .......... 310/216 |
| 6,870,292 | B2 | * | 3/2005 | Owada et al. ................ 310/194 |
| 6,984,911 | B2 | * | 1/2006 | Horie et al. ................. 310/194 |
| 2004/0245882 | A1 | | 12/2004 | Horie et al. |

FOREIGN PATENT DOCUMENTS

EP    1515418 A2  *  3/2005

(Continued)

OTHER PUBLICATIONS

Japanese language International Search Report for PCT/JP2006/313728, dated Oct. 17, 2006.

*Primary Examiner*—Tran N Nguyen
(74) *Attorney, Agent, or Firm*—RatnerPrestia

(57) ABSTRACT

There is provided a stator in which a plurality of divided stators are annularly combined with each other, and each divided stator includes: a divided lamination iron core having teeth portion and a yoke portion, and constructed by laminating electromagnetic steel sheets divided by the teeth unit; insulating bodies provided at the divided lamination iron core; and concentrated winding wound around the divided lamination iron core through the insulating body. In this case, the divided lamination iron core is held by the insulating bodies and the concentrated winding.

8 Claims, 4 Drawing Sheets

FOREIGN PATENT DOCUMENTS

| | | |
|---|---|---|
| EP | 0 748 025 B1 | 10/2006 |
| JP | 57091656 A * | 6/1982 |
| JP | 9-56099 A | 2/1997 |
| JP | 11-69738 A | 3/1999 |
| JP | 11-162722 A | 6/1999 |
| JP | 2000-333388 A | 11/2000 |
| JP | 2003-61286 A | 2/2003 |
| JP | 2003-079080 A | 3/2003 |
| JP | 2003-79080 A | 3/2003 |
| JP | 2003-102136 A | 4/2003 |
| JP | 2004248423 A * | 9/2004 |
| KR | 10-2005-0048962 | 5/2005 |

* cited by examiner

STATOR AND MOTOR, TO WHICH THE STATOR IS APPLIED, AND METHOD OF MANUFACTURING THE STATOR

This application is a U.S. National Phase Application of PCT International Application PCT/JP2006/313728.

TECHNICAL FIELD

The present invention relates to a stator in which a loss caused by lamination of electromagnetic steel sheets is reduced. The present invention also relates to a structure of a motor to which the stator is applied and a method of manufacturing the stator.

BACKGROUND ART

Concerning motors mainly used for industrial devices, it is desired to provide small and highly efficient motors so as to reduce electric power consumption. In order to accomplish the above object, highly efficient small motors are mainly used in which an iron core of a stator is divided by the teeth unit and concentrated winding is wound around the divided iron core so that a space factor of a slot winding can be enhanced and a space necessary for a winding end portion can be reduced.

Concerning the engineering method in which a certain number of the divided iron core sheets, which are made by punching an electromagnetic steel sheet, are laminated and fixed on each other so as to obtain this divided stator iron core, the following engineering methods are well known. They are as follows: an engineering method (a first engineering method) in which the divided iron core sheets are laminated on each other and the inner and outer circumferential faces are subjected to laser welding in a laminating direction; an engineering method (a second engineering method) referred to as a dowel caulking method or a PAC (Press Auto Clamp) system, in which a protruding portion and a recessing portion, which are made by conducting half blanking on the divided iron core sheet in the laminating direction, are engaged with each other and an upper core and a lower core are connected with each other by means of caulking; and an engineering method (a third engineering method) in which electromagnetic steel sheets for adhesion iron cores are used as the divided iron core sheets and laminated and fixed to each other by pressuring and heating (thermal-pressure bonding). This third engineering method is disclosed in the Japanese Patent Unexamined Publication No. H11-162722.

In the first engineering method, the following problem may be encountered. An eddy current loss is caused on a surface facing a permanent magnet of a rotor. Therefore, a motor efficiency is deteriorated. In order to reduce this eddy current loss, a method is proposed in which the divided iron core sheets are laminated and then integrated with each other into one body by means of resin. This method is disclosed in Japanese Patent Unexamined Publication No. 2000-333388. Even in the second engineering method, an eddy current loss is caused at an engagement portion in which a protruding portion and a recessing portion made by half blanking are engaged with each other.

According to the third engineering method, it is possible to reduce the aforementioned eddy current loss. However, commonly used electromagnetic steel sheets, which are used for the other engineering methods, are coated with inorganic coating material. On the other hand, in the case of the above engineering method, in order to ensure the adhesion strength, film thickness of coating used for adhesion of the electromagnetic steel sheets for the iron core is increased. Therefore, a quantity of iron per unit lamination length is lowered, that is, a space factor of the iron core is lowered. In general, a cost of this electromagnetic steel sheet used for adhesion iron core is higher than a cost of the electromagnetic steel sheet on which inorganic coating material is coated. Accordingly, the cost of the divided fixing iron core is raised.

In the conventional stator and the engineering method of manufacturing the stator, the following problems may be encountered when the divided iron core sheets are laminated and fixed. That is, an eddy current loss of the laminated iron core obtained by the laser welding or the dowel caulking system is large. A space factor of the laminated iron core obtained by the adhesion lamination engineering method is low and the manufacturing cost is high.

When the divided iron sheets are taken out without laminating and fixing them in a metallic die right after the divided iron sheets have been punched out with a punching die, the iron cores are discharged from the metallic die being separated from each other. Therefore, it becomes necessary to arrange the iron cores so that directions and both sides of the iron cores can be made to be proper. Accordingly, it takes much labor to arrange the iron cores for lamination.

DISCLOSURE OF THE INVENTION

The constitution of the stator of the present invention is described as follows. The present invention provides a stator in which a plurality of divided stators are annularly combined with each other, each divided stator including: a divided lamination iron core having a teeth portion and a yoke portion, and constructed by laminating electromagnetic steel sheets divided by the teeth unit; an insulating body provided at the divided lamination iron core; and a concentrated winding wound around the divided lamination iron core through the insulating body. In this case, the divided lamination iron core is held by the insulating body and the concentrated winding.

The present invention further includes a motor to which this stator is applied. The present invention further includes a method of manufacturing the stator which includes the following steps.

The method of manufacturing the stator includes: a step of punching an electromagnetic steel sheet with an upper press die and lower press die so as to obtain a divided iron core sheet; a step of discharging the divided iron core sheet continuously guided by a rail; a step of taking a certain number of the divided iron core sheets out through a rod-shaped jig; a step of attaching the insulating body in such a manner that the certain number of divided iron core sheets is covered by the insulating body; a step of holding the divided iron core sheets with an iron core holding jig and conducting a concentrated winding around the divided iron core sheets; a step of removing the iron core holding jig to obtain the divided stator; and a step of connecting annularly the divided stators with each other.

By this constitution and the manufacturing method, it is possible to provide a stator and a highly efficient small motor of low price, to which this stator is applied, without increasing an eddy current loss and without lowering a space factor of the iron core.

DESCRIPTION OF REFERENCE NUMERALS AND SIGNS

Figure 1:
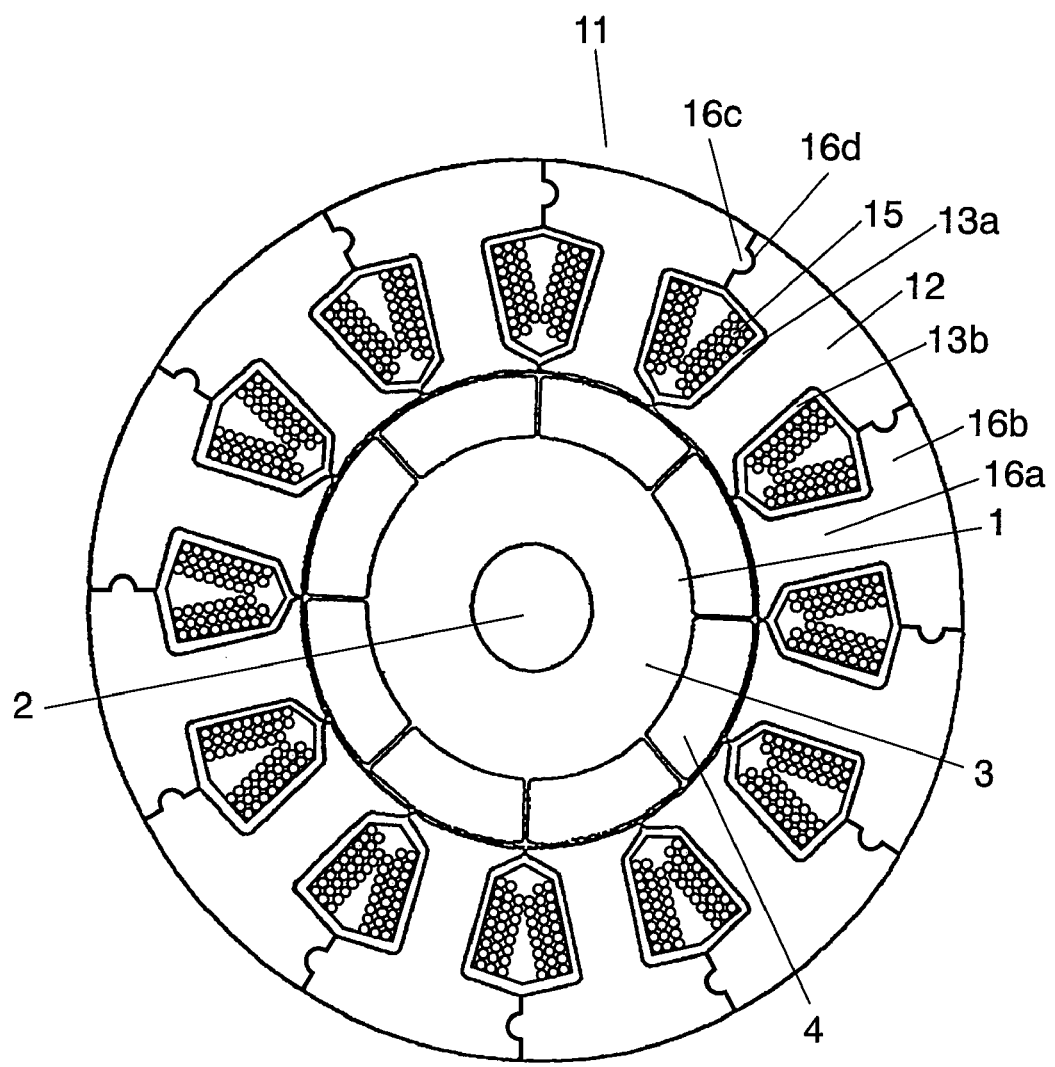
FIG. 1 is a sectional view of a motor of Embodiment 1 of the present invention.

1 Rotor
3 Iron core of rotor
4 Permanent magnet
11, 21 Stator
12, 22 Divided stator
13a, 13b, 14a, 14b Insulating body
15, 25 Concentrated winding
16, 26 Divided lamination iron core
16a, 26a Teeth portion
16b, 26b Yoke portion
23a, 23b, 24a, 24b Insulating body
26e Recess portion of divided lamination iron core
32 Electromagnetic steel sheet
33 Upper press die
34 Lower press die
35 Rail
36 Rod-shaped jig
46 Divided iron core sheet
46e Recess portion of divided iron core sheet

PREFERRED EMBODIMENTS FOR CARRYING OUT THE INVENTION

Exemplary embodiments of the present invention are demonstrated hereinafter with reference to the drawings.

Embodiment 1

FIG. 1 is a sectional view of a motor of Embodiment 1 of the present invention. As the motor of the present embodiment, an inner rotor type 8-pole-12-slot type motor is exemplarily shown here. In FIG. 1, stator 11 is composed in such a manner that twelve divided stators 12 are annularly connected to each other. Concerning joining faces of yoke portion 16b of each divided stator 12, recess portion 16d is provided at one of the joining faces and protruding portion 16c is provided at the other face of the joining faces. Due to this constitution, it is possible to conduct positioning and to ensure a mechanical strength.

Around teeth portion 16a of each divided stator 12, concentrated winding 15 is wound through insulating bodies 13a, 13b before conducting a connection.

On the other hand, 8 poles of permanent magnets 4, that is, 4 pairs of permanent magnets 4 are fixed onto an outer periphery of rotor iron core 3 of rotor 1. In this case, one pair of permanent magnets includes one N-pole and one-S pole. Rotary shaft 2 is fixed to a center of rotor iron core 3 by means of press-fitting. Rotary shaft 2 is pivotally supported by a bearing (not shown). An outer periphery of permanent magnet 4 is reinforced by a resin tape or a metallic sheet (not shown) made of non-magnetic material. Permanent magnet 4 of rotor 1 and a forward end portion of teeth portion 16a of stator 11 face each other through a certain gap.

Figure 2:
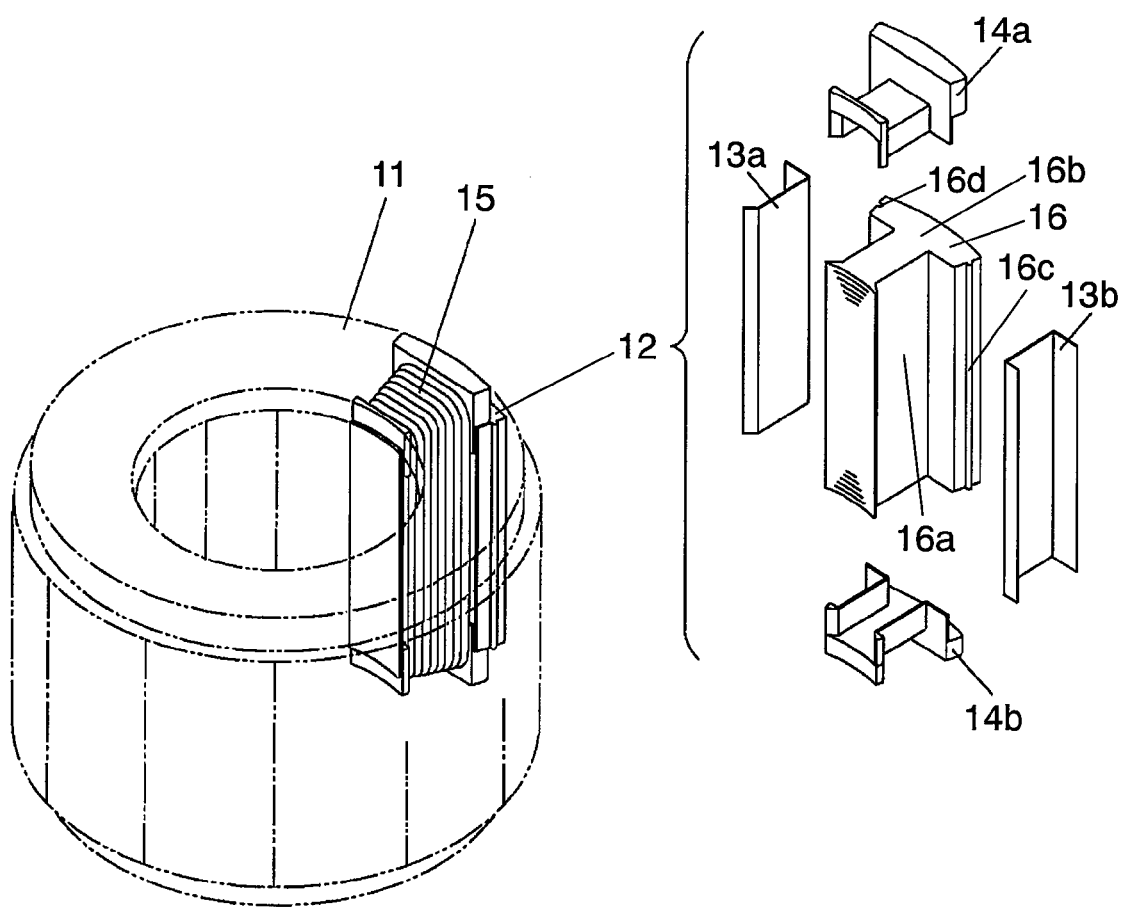
FIG. 2 is a schematic illustration of an essential part of a stator of the motor shown in FIG. 1.

FIG. 2 is a schematic illustration of an essential part of stator 11 of the motor shown in FIG. 1. Divided stator 12 is composed as follows. A certain number of divided iron core sheets, which are made by punching an electromagnetic steel sheet into a certain shape, are laminated on each other, so that divided lamination iron core 16 can be obtained. This divided lamination iron core 16 is held by an iron core holding jig as described later, however, the divided iron core sheets are not fixed to each other. Onto both sides of teeth portion 16a of this divided lamination iron core 16, insulating bodies 13a, 13b are respectively press-fitted. Onto both end faces in a laminating direction of teeth portion 16a of this divided lamination iron core 16, insulating bodies 14a, 14b are respectively press-fitted. These insulating bodies 13a, 13b, 14a, 14b are arranged so that divided lamination iron core 16 is covered by them. In this state, a certain concentrated winding work is conducted by a winding machine (not shown). In this way, divided stator 12 is manufactured.

An end of this winding is connected to a junction terminal (not shown) provided at insulating body 14a or 14b. After divided stators 12 are annularly connected to each other, a certain connection is made.

Although portions between the divided iron core sheets are not fixed, the divided iron core sheets are held by concentrated winding 15 through insulating bodies 13a, 13b, 14a, 14b which are arranged in such a manner that they cover concentrated winding 15. Therefore, the divided iron core sheets are not separated from each other. Unlike the conventional method, it is unnecessary to conduct laser welding on the divided iron core sheets and to provide an engagement portion formed out of a recess portion and a protruding portion by conducting half blanking. Accordingly, an eddy current loss is not increased. Since it is unnecessary to use an electromagnetic steel sheet for an adhesion iron core, a space factor of the iron core is not lowered. Therefore, by using the stator of this Embodiment 1, it is possible to provide a highly efficient small motor of low price.

Embodiment 2

Figure 3:
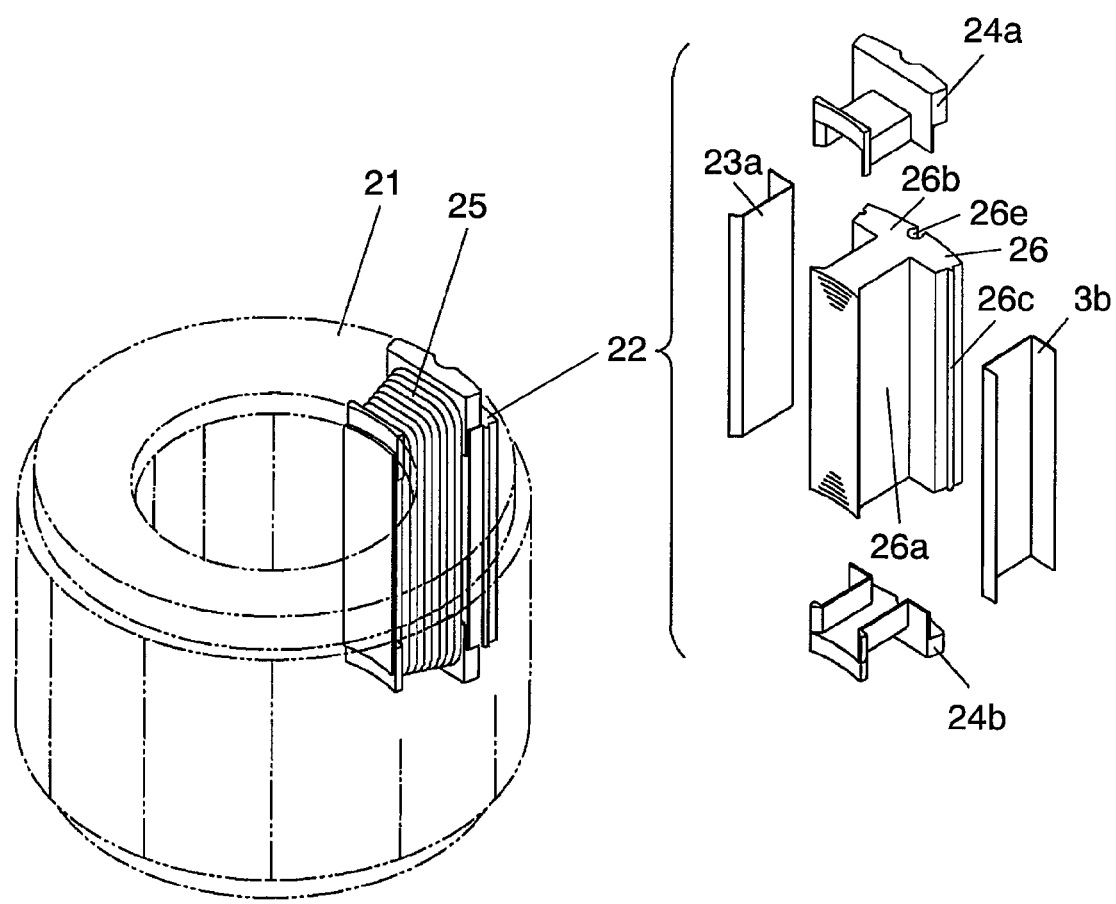
FIG. 3 is a schematic illustration of an essential part of a stator of Embodiment 2 of the present invention.

FIG. 3 is a schematic illustration for showing an essential part of stator 21 of Embodiment 2 of the present invention. Divided lamination iron core 26 of this embodiment includes recess portion 26e on an outer periphery of the yoke portion. By this recess portion 26e, divided iron core sheets, which have been obtained by punching out an electromagnetic sheet with a metallic press die, are continuously discharged. Therefore, it becomes easy to take out a certain number of divided iron core sheets and to conduct a winding work. Except for that, the essential constitution is the same as that of Embodiment 1.

A certain number of divided iron core sheets, which are made by punching an electromagnetic steel sheet into a certain shape, are laminated on each other, so that divided lamination iron core 26 can be obtained. This divided lamination iron core 26 is held by an iron core holding jig as described later, however, portions between the divided iron core sheets are not fixed. Onto both sides of teeth portion 26a of this divided lamination iron core 26, insulating bodies 23a, 23b are respectively press-fitted. Onto both end faces in a laminating direction of teeth portion 26a of this divided lamination iron core 26, insulating bodies 24a, 24b are respectively press-fitted. These insulating bodies 23a, 23b, 24a, 24b are arranged in such a manner that divided lamination iron core 26 is covered by them. In this state, a certain concentrated winding work is conducted by a winding machine (not shown). In this way, divided stator 22 is manufactured.

In this connection, an end of this winding is connected to a junction terminal (not shown) provided at insulating body 24a or 24b. After divided stators 22 have been annularly connected to each other, a certain connection is made.

Although the divided iron core sheets are not fixed to each other, the divided iron core sheets are held by concentrated winding 25 through insulating bodies 23a, 23b, 24a, 24b which are arranged in such a manner that they cover concentrated winding 25. Therefore, the divided iron core sheets are not separated from each other. Unlike the conventional case, it is unnecessary to conduct laser welding on the divided iron core sheets and to provide an engagement portion formed out of a recess portion and a protruding portion by conducting half blanking. Accordingly, an eddy current loss is not increased. Since it is unnecessary to use an electromagnetic steel sheet for an adhesion iron core, a space factor of the iron core is not lowered. Therefore, by using the stator of this Embodiment 2, it is possible to provide a highly efficient small motor of low price.

Figure 4:
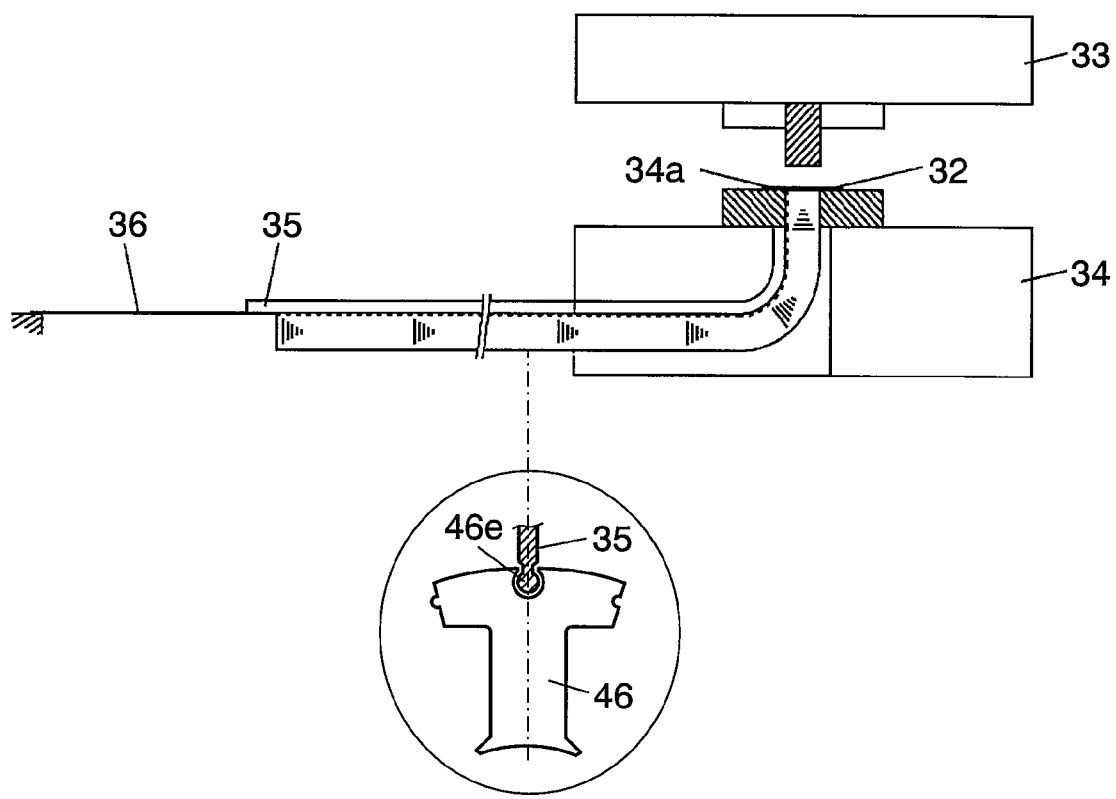
FIG. 4 is a schematic illustration showing a method of manufacturing a divided lamination iron core of a stator shown in FIG. 3.

FIG. 4 is a schematic illustration showing a method of manufacturing a divided lamination iron core of a stator in Embodiment 2 of the present invention. Electromagnetic sheet 32 is fed onto lower press die 34. By a vertical movement of upper press die 33, divided iron core sheet 46 is continuously punched out into a certain shape. Thus punched divided iron core sheet 46 is continuously and successively discharged in such a manner that recess portion 46e of divided iron core sheet 46 is being guided by rail 35 arranged from punching portion 34a of lower press die 34 to the outside of the device.

In this connection, recess portion 46e provided at divided iron core sheet 46 is formed into a substantial circle having an opening portion, wherein an opening portion of the circle is smaller than a diameter of the circle.

In this case, rod-shaped jig 36 is made to come into contact with an end portion of rail 35 and a certain number of divided iron core sheets 46 are taken out through recess portions 46e so as to compose divided lamination iron core 26. When a cross-sectional shape of this rod-shaped jig 36 is set to be larger than the opening portion of recess portion 46e, divided iron core sheets 46 do not fall off from rod-shaped jig 36 under the condition that divided iron core sheets 46 engaged with rod-shaped jig 36 are taken out from rail 35.

Next, while insulating bodies 23a, 23b are being attached so as to be laid on an inner wall of teeth portion 26a of divided lamination iron core 26 in order to insulate concentrated winding 25 from divided lamination iron core 26, insulating bodies 24a, 24b are press-fitted from both end portions of divided lamination iron core 26 in such a manner that insulating bodies 23a, 23b are interposed between them. Even in this step, divided iron core sheets 46 do not fall off because of rod-shaped jig 36. Therefore, divided iron core sheets 46 can be easily aligned on the basis of rod-shaped jig 36.

In the next winding step, in divided lamination iron core 26, faces, on which insulating bodies 23a, 23b, 24a, 24b are not arranged, are held by an iron core holding jig (not shown) and concentrated winding 25 is conducted in teeth portion 26a of divided lamination iron core 26 on which insulation treatment has already been conducted. After that, by removing this jig, divided stator 22 having concentrated winding 25 can be obtained.

Then, twelve divided stators 22 are annularly arranged and divided faces are joined and fixed to each other. After that, ends of concentrated winding 25 are subjected to a certain connection processing. In this way, stator 21 is completed. Concerning the method of fixing the joining portion, for example, laser beam welding or adhesion, which is a conventional engineering method, may be adopted. Laser welding, which is conducted on an outer peripheral portion of the iron core, seldom affects a magnetic flux and further it is possible to minimize an eddy current loss.

In this connection, in order to minimize a magnetic loss, it is preferable that recess portion 46e is provided in an outer peripheral portion at a center of the magnetic pole and a size of recess portion 46e is minimized as long as a rod-shaped jig can be inserted into recess portion 46e. An annular structure such as a frame may be attached onto an outer periphery of the stator of the present invention by means of press-fitting or shrinkage fitting. Further, in order to prevent this annular structure and the stator from being moved from by a reaction force, a pin may be driven into recess portion 46e from the outside.

INDUSTRIAL APPLICABILITY

As described above, according to the present invention, it is possible to provide a stator and a highly efficient small motor of low price, to which this stator is applied, without increasing an eddy current loss and without lowering a space factor of the iron core. Especially, the motor of the present invention can be effectively applied as a small motor for industrial use.

The invention claimed is:

1. A stator comprising:
a plurality of annularly combined divided stators, each of the divided stators including:
a divided lamination iron core having a teeth portion and a yoke portion, the divided lamination iron core comprising a plurality of divided iron core sheets that are not fixed to each other;
an insulating body provided at the divided lamination iron core; and
a concentrated winding wound around the divided lamination iron core and the insulating body, wherein
the plurality of divided iron core sheets of the divided lamination iron core is held together by the insulating body and the concentrated winding.

2. The stator of claim 1, wherein the insulating body is provided at both sides in a laminating direction of the divided lamination iron core and at both sides of the yoke portion in such a manner that the divided lamination iron core is covered by the insulating body.

3. The stator of claim 1, wherein the divided lamination iron core has a recess portion at an outer periphery of the yoke portion, and an opening portion of the recess portion is smaller than an inside.

4. A motor comprising:
a rotor having a permanent magnet; and
a stator facing the permanent magnet through a gap, the stator comprising a plurality of annularly combined divided stators, each of the divided stators including:
a divided lamination iron core having a teeth portion and a yoke portion, the divided lamination iron core comprising a plurality of divided iron core sheets that are not fixed to each other;
an insulating body provided at the divided lamination iron core; and
a concentrated winding wound around the divided lamination iron core and the insulating body, wherein
the plurality of divided iron core sheets of the divided lamination iron core is held together by the insulating body and the concentrated winding.

5. The motor of claim 4, wherein the insulating body is provided at both sides in a laminating direction of the divided lamination iron core and at both sides of the yoke portion in such a manner that the divided lamination iron core is covered by the insulating body.

6. The motor of claim 4, wherein the divided lamination iron core has a recess portion at an outer periphery of the yoke portion, and an opening portion of the recess portion is smaller than an inside.

7. A method of manufacturing a stator, the stator having a plurality of annularly combined divided stators, each of the divided stators including:
a divided lamination iron core having a teeth portion and a yoke portion, the divided lamination iron core comprising a plurality of divided iron core sheets that are not fixed to each other;
an insulating body provided at the divided lamination iron core; and
a concentrated winding wound around the divided lamination iron core and the insulating body,
the method of manufacturing the stator comprising:
a step of punching an electromagnetic steel sheet continuously with an upper press die and lower press die so as to obtain a divided iron core sheet;
a step of discharging the divided iron core sheet continuously guided by a rail;
a step of taking a predetermined number of the divided iron core sheets out through a rod-shaped jig such that the divided iron core sheets remain unfixed from each other;
a step of attaching the insulating body in such a manner that the predetermined number of divided iron core sheets is covered by the insulating body;
a step of holding the divided iron core sheets with an iron core holding jig and conducting a concentrated winding around the covered divided iron core sheets;
a step of removing the iron core holding jig to obtain the divided stator; and
a step of connecting annularly the divided stators with each other.

8. The method of manufacturing a stator of claim 7, wherein the divided iron core sheet has a recess portion, the opening portion of which is smaller than an inside, on an outer periphery of the yoke portion, and a cross-section of the rod-shaped jig is larger than the opening portion of the recess portion.

* * * * *